Oct. 30, 1934.   P. K. SAUNDERS   1,978,603
DIAPHRAGM VALVE
Filed Nov. 16, 1931   4 Sheets-Sheet 1

Inventor
Philip K. Saunders
By A. Miller Belfield,
Atty

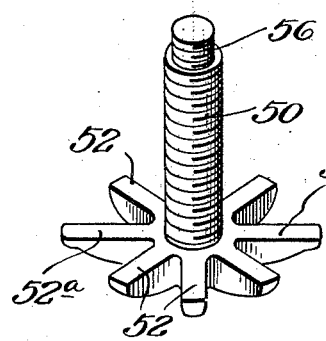
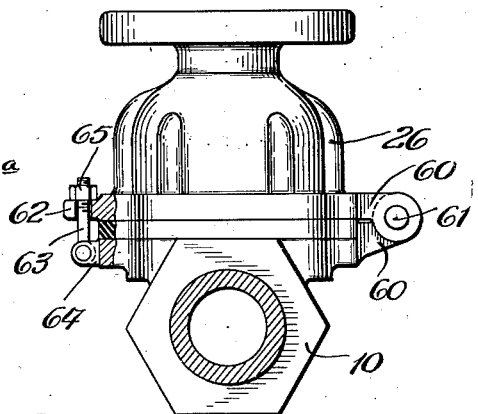
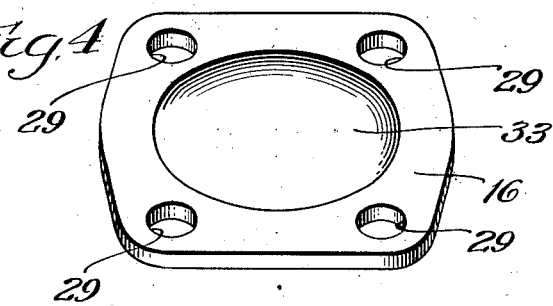
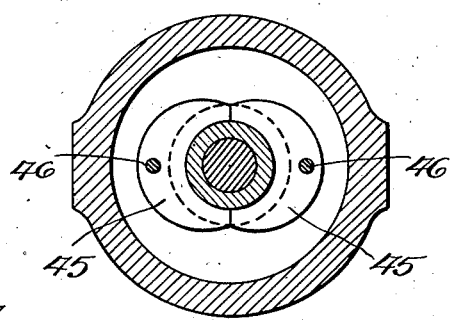
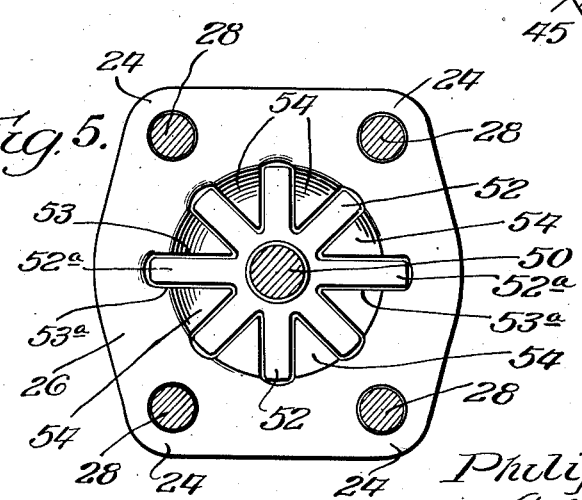

Oct. 30, 1934.    P. K. SAUNDERS    1,978,603
DIAPHRAGM VALVE
Filed Nov. 16, 1931    4 Sheets-Sheet 3

Inventor
Philip K. Saunders
By A. Miller Belfield,
Atty.

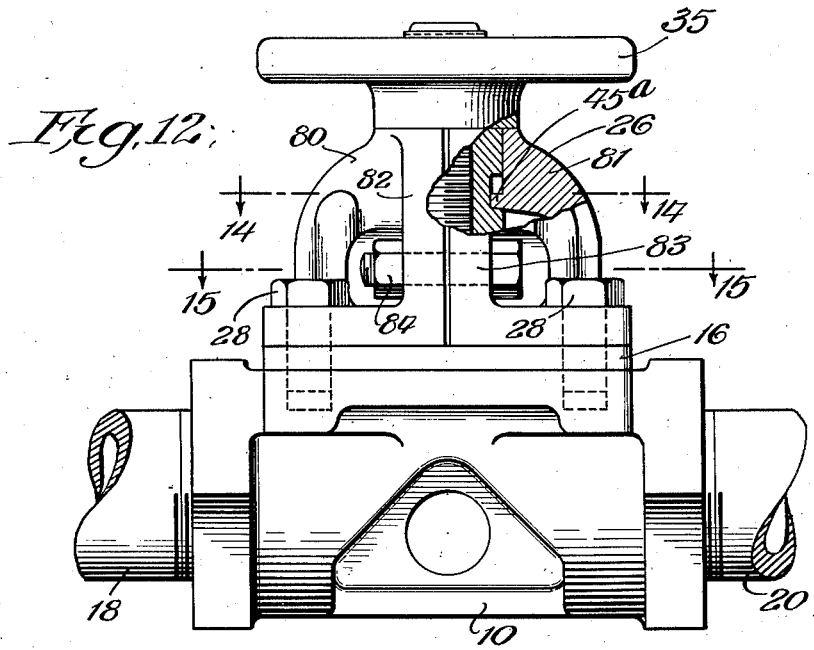
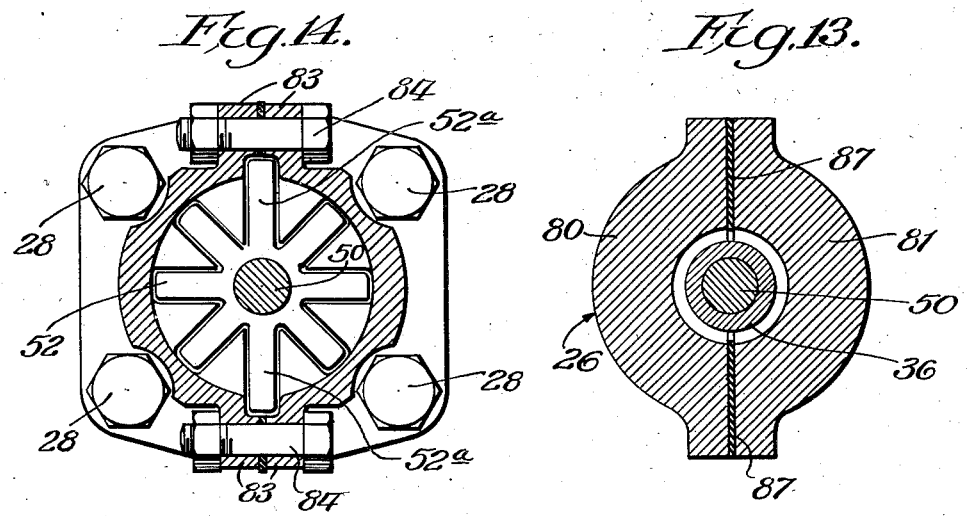

Patented Oct. 30, 1934

1,978,603

UNITED STATES PATENT OFFICE 1,978,603

DIAPHRAGM VALVE

Philip Keith Saunders, Montreal,
Quebec, Canada

Application November 16, 1931, Serial No. 576,917

13 Claims. (Cl. 251—24)

My invention relates to valves and like devices.

The invention relates more particularly to a packless valve of the diaphragm type wherein a flexible diaphragm is actuated to open or close the passageway through the valve.

An object of my invention is to provide an improved diaphragm valve that will be simple and inexpensive to manufacture, and will be durable and capable of long use under extreme circumstances.

A further object of my invention is to provide a valve of this type so constructed that the same will be more or less water-tight so that there will be a comparatively insignificant amount of leakage through the valve in the event of a bursted diaphragm.

A further object is to provide a diaphragm valve of the type specified wherein the head room will be cut down to a minimum so that the valve may be placed in what are ordinarily inaccessible places or smaller spaces than ordinary valves can be placed in.

A further object is to provide a valve of this type wherein there is no projecting spindle which may become bent or damaged in use.

A further object is to provide in a valve of this type means associated with the valve closing and opening mechanism whereby the position of the valve may be determined either by the appearance of the valve or by feeling of the valve in a particular location.

A further object of the present invention is to provide an improved construction in a valve of this type whereby the same may be made without the necessity of any machine work upon the parts thereof, thus producing a valve that can be easily and cheaply manufactured.

A further object of the present invention is to provide a construction of valve whereby the diaphragm will be effectively supported in any and all positions so that the danger of bursting of the diaphragm is greatly minimized.

A further object is to provide improved means for lubricating the screw parts of the valve operating mechanism and to provide an effective protecting means to prevent oil or grease from reaching the diaphragm.

A further object is to provide an improved valve whereby the bonnet and the valve body are so constructed that the same may be easily assembled or disassembled and whereby the parts are so constructed that it will be impossible to assemble the valve in an inoperative position.

A further object is to provide an improved diaphragm whereby the same will be more or less self-opening, thus facilitating the passage therethrough of low pressure fluids.

A further object is to provide an improved diaphragm that will be resiliently self-opening against the valve operating mechanism.

A further object is to provide in a valve mechanism of this type housing and bonnet means capable of being manufactured without machining, thus materially reducing the cost of manufacture thereof.

A further object is to provide an improved hinged valve structure (shown in Fig. 8) whereby the valve body and bonnet may be easily and quickly opened for the replacement or repair of a valve diaphragm.

A further object is to provide an improved structure of valve whereby the valve bonnet and valve body may be secured together by ordinary U bolts.

Other objects and advantages will be readily apparent from the following description wherein reference is had to the accompanying sheets of drawings upon which one embodiment of my invention and several modifications thereof are illustrated.

The invention will be described with particular reference to a valve structure that is extremely rigid and compact. Valves of this type are desirable for installation in mines and other places where a rugged, compact valve is desired. The use of a long, exposed stem in valves in the mining districts, or other installations where low head-room is required, is extremely undesirable due to the rough and possibly destructive tactics of the unskilled labor ordinarily employed in these mines, as well as the natural rough usage to which the valves are subjected due to the explosions, earth movements and other acts normally occurring in mines. For installations of this type it has been found advisable to construct, if possible, a valve wherein the position of the valve upon its seat may be easily determined by feeling a particular portion of the valve. As is frequently the case, due to accidents or explosions, or other causes, a mine is plunged into darkness and the air lines, as well as possibly the water lines, must necessarily be kept open to safeguard life and property.

The above and other advantages will be more apparent from the foregoing description taken in connection with the accompanying drawings which illustrate the preferred embodiment and several modifications of my improved valve.

In the drawings, Fig. 1 is a side elevational view of my improved valve structure with portions broken into section to show more clearly other portions thereof;

Fig. 3 is a perspective view of the screw member of the valve operating mechanism;

Fig. 4 is a perspective view of the diaphragm in a normal position;

Fig. 5 is an inverted plan sectional view of the bonnet and valve operating mechanism taken on the line 6—6 of Fig. 1;

Fig. 6 is a similar inverted plan sectional view taken on the lines 7—7 of Fig. 2;

Fig. 7 is a side elevational view with portions broken into section to more clearly show other portions, showing a modified construction of the valve mechanism;

Fig. 12 illustrates a still further modified form of my invention wherein I employ a split bonnet;

Fig. 13 is a sectional view thereof taken on the lines 14—14 of Fig. 12;

Fig. 14 is a plan sectional view taken at a different elevation and on the lines 15—15 of Fig. 12; and Fig. 15 is a cross sectional view of a flexible plate unit which may be employed with any one of the forms of the invention shown herein.

Figure 1:
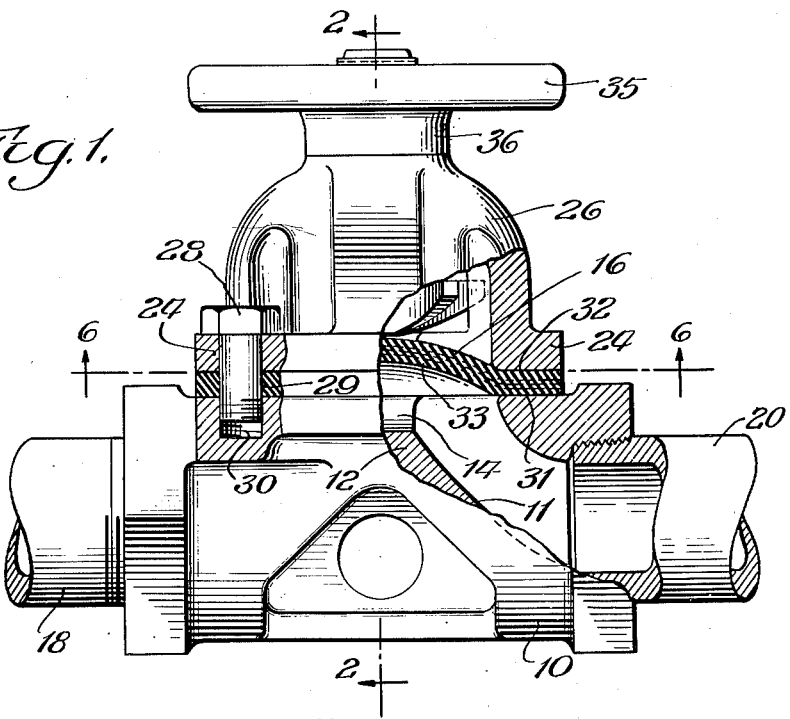

As clearly illustrated in Fig. 1, the device may consist of a valve body 10 having a substantially straight through bore or passageway 11 intersected by a shallow weir or wall structure 12 which extends across the width of the bore and part way of its depth and is formed with a downwardly or concavely shaped upper face 14 which constitutes the seat upon which the diaphragm 16 is adapted to be seated.

The bore or passageway 11 through the valve, which is entirely devoid of sudden bends or angles that might induce eddies or otherwise interfere with a free flow of the fluid, curves gradually up to and down from the seat 14 of the weir and the width of the body is enlarged at its center to compensate for the reduction of height arising from the presence of the weir. A pair of pipe lines 18 and 20 may extend from either side of the valve body 10 and communication may be established therebetween through the pasageway 11. It will be noted that this construction ensures a stream line valve construction whereby when the valve is in an open position the flow therethrough will be more or less smooth and uninterrupted due to the fact that the cross sectional area of the passageway throughout is very nearly the same.

A flexible diaphragm 16 is adapted to be clamped between flanges 22 formed on the valve body and similar flanges 24 formed on the bonnet 26. The bonnet is clamped into position by suitable screw members 28 which may pass through openings 29 in the diaphragm 16 and be screw-threadedly mounted in suitable tapped openings 30 in the valve body 10.

The faces 31 and 32 of the valve body 10 and the bonnet 26, respectively, may be roughened upon their abutting faces to increase the grip thereof upon the diaphragm. I have found that by casting these members and not finishing the faces thereof, a sufficiently rough surface is obtained to operate very satisfactorily, thereby eliminating the necessity of doing any machine work upon these faces.

Figure 2:
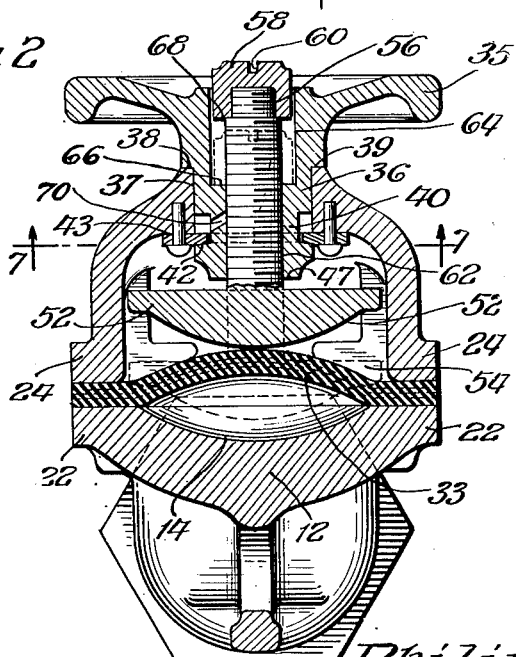
Fig. 2 is a vertical sectional view taken on the lines 2—2 of Fig. 1.

The diaphragm 16 is preferably constructed of a rubberized fabric consisting of one or more layers of woven fabric material connected together and coated upon both sides with rubber, the coating of rubber being preferably of greater thickness on that side which co-acts with the valve seat 14. The diaphragm is preferably formed with the central portion 33 thereof upwardly bulged in the manner shown in Figs. 1, 2 and 5. This is for the purpose of allowing the valve to spring open when the valve operating mechanism is released thereabove. By constructing the diaphragm in this manner, I have found that it is not necessary to connect the valve operating mechanism to the diaphragm directly; rather simply to provide a movable wall structure above the diaphragm to urge the same downwardly to a closed position, said movable wall being adapted to be backed away in a valve opening position and the valve, due to its own resiliency, moving to its normal or bulged shape.

The valve operating mechanism may comprise a hand wheel 35 formed with the downwardly depending annular portion 36. The annular portion 36 may be seated in a suitable bore 37 of the bonnet 26 and may have a shoulder 38 normally resting upon a seat 39 formed at the upper end of bonnet 26. The shank 36 of the hand wheel is further formed adjacent its lower end with a reduced portion 40 which is adapted in a normal position to provide a shoulder 42 slightly below the upper wall 43 of the bonnet 26. A pair of split washer elements 45 is positioned between the shoulder 42 and the wall 43 and rigidly held in this position by a pair of rivet members 46 which are driven into the upper wall of the bonnet member 26. By this means the hand wheel 35 is effectively locked into position for rotary movement within the bonnet 26. The shank 36 thereof extends downwardly and provides a valve operating stop element 47 at its lower end which will be referred to hereinafter.

The portion of the valve operating mechanism illustrated in perspective in Fig. 4 may include a threaded shank 50 which is formed at its lower end with a plurality of radially extending arms 52. These arms 52 are adapted to project into and be guided in a vertical direction in recesses 53 formed by a plurality of inwardly projecting fingers 54 cast integral with the bonnet 26. Thus the fingers 54 formed by the slots 53 provide an efficient guide member for the arms 52. It will be noted that arms 52ª are longer than the other arms on the stem 50 and the corresponding slots 53ª are deeper than any of the other slots 54. This is for the purpose of positioning the valve operating element in its proper position in the valve bonnet.

The stem 50 is formed with a reduced upper portion 56 upon which a cap member 58 is screw-threadedly mounted. A kerf 60 is formed in the upper surfaces of cap 58 to adjust the same. Stem 50 is adapted to be screw-threadedly mounted in a suitable tapped opening 62 which extends through the lower portion of shank 36 of the hand wheel. An enlarged bore 64 is formed axially in shank 36, aligning with opening 62 so that cap 58 may be moved upwardly and downwardly therein. The bore is formed with a lower shoulder 66 which co-operates with the bottom wall 68 of cap 58 to provide a lower limit stop for the valve operating element. The stop element previously referred to obviously provides an upper limit stop through contact with the upper surface of fingers 52.

With the foregoing construction it will be clear that a valve has been provided which is rugged and in which the screw parts, which might be affected by the atmosphere or other exterior conditions, are entirely enclosed within the bonnet and the hand wheel stem. The cap 58 is provided to act as a limit stop in closing the valve and when the cap strikes the lower wall 66 it will be clear that no further turning of the handle 35 is possible. When the valve is in the position with cap 58 shown in dotted lines, by inserting a finger into the opening 64 and feeling the position of the cap, the condition of the valve as to whether the same is partially open or closed can be readily determined. Further, it will be seen that when the cap 58 is in the position shown in Fig. 2, the upper portion of the cap may be visible over the hand wheel 35, thus indicating by sight that the valve is in an open position.

A lubricant passageway 70 has been provided through the annular portion 40 to allow lubricant, which may be inserted through bore 64, to seep down the threads of the stem and lubricate the engaging shoulders of the shank 36 and the collars 45. This will materially aid in providing a free, easy movement of the hand wheel 35.

Figure 8:
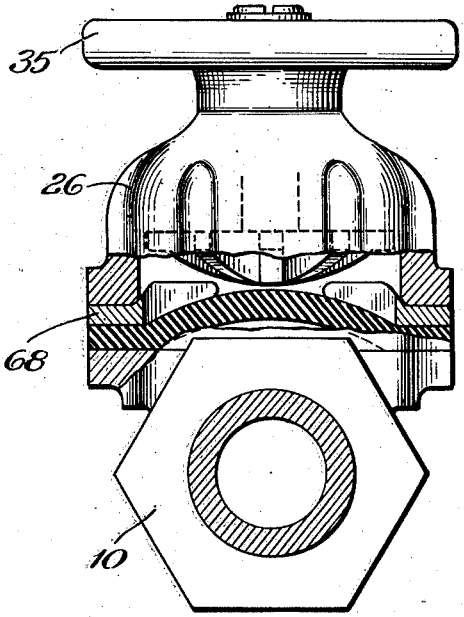
Fig. 8 is a similar view showing a still further modified form of valve construction wherein the portion of the bonnet carrying the backing fingers is shown as a separate individual unit or false-plate.

In Fig. 8 I have illustrated a modification of my construction wherein the bonnet 26 and the valve body 10 are both formed with outwardly extending ears 60 through which a pivot member 61 may be inserted to provide a hinge action between the parts. At the front side of the valve a suitable clamping or locking means may be provided to hold the bonnet upon the valve body in a sealed position. This may comprise a pair of separated finger elements 62 which may extend forwardly from the lower flange of bonnet 26 to engage a locking means in the form of a bolt 63 pivotally mounted upon the ears 64 extending outwardly from the upper side of the valve body 10. A nut 65 may be provided for the bolt 63 which may be adjusted to clamp the parts together to any suitable tension. It will be obvious that various clamp or hinge arrangements may be constructed, and the specific structure shown is merely to illustrate the generic idea.

Figure 9:
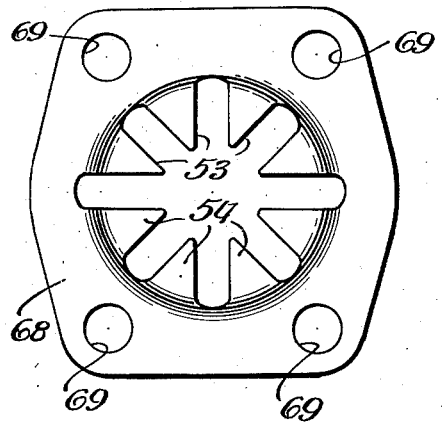
Fig. 9 is a plan view of the false-plate.
Figure 10:
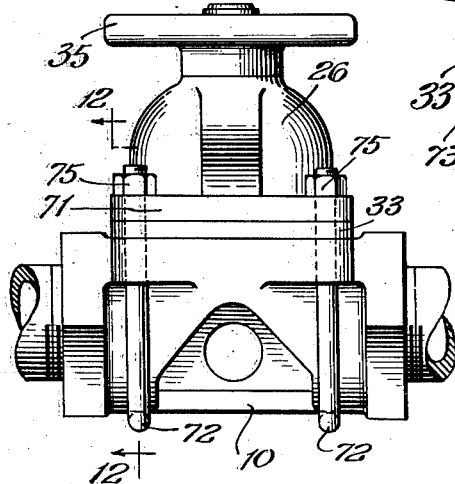
Fig. 10 is a side elevational view of a still further modified form of valve construction wherein U bolts are employed to secure the bonnet and the valve body together.

Figs. 9 and 10 illustrate a modification of my invention whereby the cost thereof may be considerably decreased without interfering with the efficient and satisfactory operation thereof. In this construction I provide an additional element which may comprise the false-plate 68. The false-plate 68 may be formed with the fingers 54 and the slots or spaces 53 formed thereby. The same may be shaped similarly to the diaphragm 16 having holes 69 which align with the holes through the diaphragm 16. By placing the false-plate 68 with the fingers 54 formed therein, above the diaphragm it can be seen that the bonnet casting 26 will have a smooth interior finish and it will be an easy matter to cast the same from any suitable material. The false-plate 68 is of course rigidly bolted in place when the assembly is fastened together and this construction provides a greatly cheapened cost of manufacture. However, it can readily be seen that the efficiency of the valve is not interfered with in any manner whatsoever.

Figure 11:
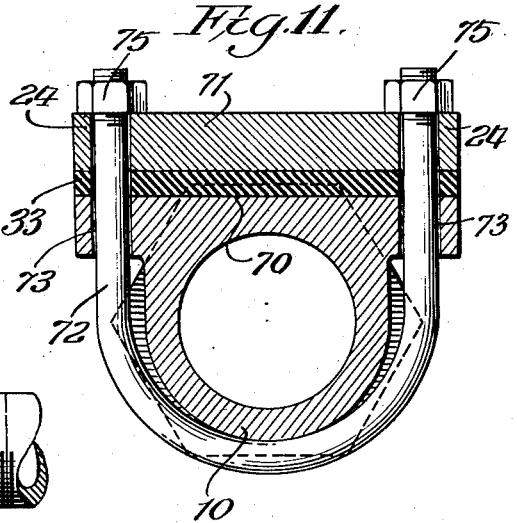
Fig. 11 is a vertical sectional view thereof taken on the lines 12—12 of Fig. 10.

In Figs. 11 and 12 I provide a still further modified form of construction wherein the machining of the bonnet or the valve body may be entirely eliminated. It has been found desirable in constructing valves of this type to leave the upper surface 70 of the valve housing 10 and the lower surface 71 of the bonnet 26 in the roughened or unfinished condition in which the castings are provided. This is for the purpose of securing a more effective gripping action upon the rubber diaphragm 33. Accordingly with the construction shown in Figs. 11 and 12 the units are assembled together by utilizing a pair of U bolts 72 which are arranged to pass under the body portion of valve 10 and upwardly through the flanges 24 of the bonnet 26. These U bolts may pass through suitable aligned drilled or cored openings 73 in the several parts. The parts may be rigidly secured together by placing screw members 75 upon the threaded upper ends of the U bolts and fastening the same down to any desired tension.

In Figs. 13, 14 and 15 I illustrate a still further modified form of the invention which has also been constructed for the purpose of cheapening the cost of manufacture thereof without, however, interfering with the efficiency, the strength or the durability of my construction. Accordingly I form the bonnet 26 of a pair of castings 80 and 81 which are formed by a split in the bonnet in a vertical manner and formed with suitable side flanges 82 and 83 through which fastening bolts 84 are passed to securely bolt the same together to form an integral bonnet unit. By forming these castings in this manner I am able to form a stop means 45$^a$ integral with the castings so that the provision of the split washers 45, shown in the preferred construction, is entirely unnecessary. A suitable gasket 87 may be utilized with the split portions of the bonnet to provide a positive seal along the meeting surfaces.

In order to prevent grease, oil or other sediment, which may pass downwardly along the screw mechanism, from reaching the rubber diaphragm, I may utilize a thin, flexible plate 88, such as shown in Fig. 16, above the diaphragm below the fingers 54. This plate may be of any suitable thin, metallic material and may be rendered springy and flexible either by corrugating, punching the center portion in the form of a spiral, or in any other suitable manner. In this connection I have illustrated the same as being formed by punching so that the flexible plate may have a spiral strip 89 therein. I have found that the provision of such a protecting plate increases the life of the diaphragm by preventing disintegrating or dissimilation thereof during long usage.

It will be noted that the diaphragm 16, as well as the meeting faces of the valve body 10 and the bonnet 26, are more or less rectangular in shape. The position of the openings 29 through the diaphragm and their aligned openings in both the valve body and the bonnet are such that the same can only be placed in the valve during assembly in the one position in which the same should necessarily be placed. Thus it can be seen that by this construction the wrong assembly of the device is obviously impossible.

While I have illustrated and described a preferred form of my invention and some modifications thereof, it will be apparent that other changes and modifications may be made without departing from the scope of my invention. The invention is capable of wide variation within suitable limits and I contemplate that many changes may be made without departing from the spirit of the invention and I do not wish to limit myself to the specific details shown; rather what I desire to secure and protect by Letters Patent of the United States is:—

1. A valve structure comprising a housing, a bonnet, a self-opening diaphragm valve between said housing and said bonnet, means for operating the valve comprising a rotatable member positioned above the bonnet of said housing, said rotatable member arranged to rotate in a constant plane to operate said valve and stop means for limiting the movement of the valve at an open and at a closed position.

2. A valve of the type described having a diaphragm valve, a concave seat for said diaphragm valve, a diaphragm actuating plunger, and a false-plate above said diaphragm to provide a backing therefor, said false-plate and said plunger adapted to co-operate to form a backing for the diaphragm valve in a closed, open or intermediate position.

3. A valve of the type described comprising a housing, a bonnet thereon, a diaphragm valve between the housing and bonnet, valve operating means enclosed in said bonnet, a stem extending therefrom, means for actuating said stem and valve operating means and means for lubricating the valve operating parts comprising a well or recess for lubricant at the upper end of said stem and an outlet for lubricant below said well or recess.

4. A valve of the class specified comprising a valve body, a diaphragm valve, means for controlling actuation of said valve, a screw threaded member carried by said means, and a rotary member having a threaded opening to receive said screw threaded member and also having a well or recess on the outer side of said opening to receive the outer end of said screw threaded member, the well and threaded member being adapted to permit the outer end of the latter to work in said well and to come to substantially the outer end of the same when the threaded member is in its outermost position, whereby the condition of the valve will be indicated by said threaded member.

5. A valve device having a movable valve and a valve operating member carrying an indicating member and a movable device for actuating said valve operating member having a well or recess in which the outer end of said indicating member works, the end of the indicating member being adapted to come about flush with the outer end of said well when said member is in an outermost position to indicate the condition of the valve.

6. A valve device having a diaphragm forming a valve and a member for actuating the diaphragm, a threaded member carried by the valve actuating member, a rotary hand wheel having a hub portion provided with a threaded opening to receive said threaded member, the rotary hand wheel being prevented from reciprocating movement and the diaphragm actuating member and threaded member being held against rotation, and the hand wheel being provided with a well or recess to receive the outer end of the threaded member which is of such size as to come about flush with the outer open end of said recess when said threaded member is in an outermost position, whereby the condition of the valve will be indicated by said threaded member.

7. A valve device having a diaphragm forming a valve and a member for actuating the diaphragm, a threaded member carried by the valve actuating member, a rotary hand wheel having a hub portion provided with a threaded opening to receive said threaded member, the rotary hand wheel being prevented from reciprocating movement and the valve actuating member and threaded member being held against rotation, said hand wheel having a well or recess to receive the outer end of the threaded member which is of such size as to come about flush with the outer open end of said recess when said threaded member is in an outermost position, whereby the condition of the valve will be indicated by said threaded member, and an adjustable member on the end of said threaded member, said hub portion having its lower end adapted to serve as a stop for the diaphragm actuating member.

8. A valve device having a valve body and a bonnet arranged above the body, a diaphragm forming a valve and located between the body and bonnet, a member in the bonnet for controlling the movement of the diaphragm, a threaded member secured to said member and forming a stem therefor, a rotary hand wheel mounted above the bonnet and having a threaded opening to receive the threaded stem and co-operate therewith and also having a recess or well above said opening, the upper end of the threaded stem being arranged to work in said well or recess and being of such length as to come to the top of the well or recess when it is in its outermost position, the diaphragm controlling member and stem being locked against rotation and the rotary hand wheel being locked against movement longitudinally of the threaded stem.

9. A valve device having a valve body and a bonnet arranged above the body, a diaphragm forming a valve and located between the body and bonnet, a member in the bonnet for controlling the movement of the diaphragm, a threaded member secured to said member and forming a stem therefor, a rotary hand wheel mounted above the bonnet and having a threaded opening to receive the threaded stem and co-operate therewith and also having a recess or well above said opening, the upper end of said stem being arranged to work in said well or recess and being of such length as to come to the top of the well or recess when it is in its outermost position, the diaphragm controlling member and stem being locked against rotation and the rotary hand wheel being locked against movement longitudinally of the threaded stem, and a nut adjustable on the upper end of said threaded stem and having an adjustable threaded connection therewith.

10. A device of the class specified comprising a body member having passages to form a streamline valve, a bonnet mounted on the body member, a diaphragm forming a valve and located between the body member and bonnet, a diaphragm actuating member in the lower part of the bonnet arranged to make contact with the diaphragm and having a bowed contacting surface, co-operating shoulders on said member and on the bonnet for permitting vertical movement on the part of said member and preventing rotation thereof, a threaded stem secured to said member and extending upwardly therefrom, a rotary hand wheel mounted on the bonnet and having a hub portion extending down into the same and provided with a threaded opening receiving said threaded stem, co-operating stops and shoulders on the bonnet and hand wheel for permitting rotation of the latter and preventing axial movement thereof, and a threaded nut at the upper end of the threaded stem, said hand wheel being provided with a well or recess to receive said nut.

11. A valve device having a diaphragm forming a valve and a member for actuating the diaphragm, a threaded member carried by the valve actuating member, a rotary hand wheel having a hub portion provided with a threaded opening to receive said threaded member, the rotary hand wheel being prevented from reciprocating movement and the diaphragm actuating member and threaded member being held against rotation, the hand wheel being provided with a well recess to receive the outer end of the threaded member which is of such size as to come about flush with the outer open end of said recess when said threaded member is in an outermost position whereby the condition of the valve will be indicated by said threaded member, and an adjustable member on the end of said threaded member.

12. A valve of the class described comprising a diaphragm forming a valve, an adjustable member for actuating said diaphragm, a stem for said adjustable member, a rotary member for actuating said stem and adjustable member, and a lubricating means for lubricating the stem comprising a lubricant chamber or recess in said rotary member at the upper portion of said stem, and an outlet duct leading from said stem below said chamber or recess.

13. A valve device of the class specified comprising a housing, a bonnet, a diaphragm valve between the housing and bonnet, a diaphragm actuating plunger and a false plate located above said diaphragm and between the housing and the bonnet, said false plate being adapted to provide a backing for the diaphragm and said false plate and plunger being adapted to cooperate to form a backing for the diaphragm when in a closed, open or intermediate position.

PHILIP KEITH SAUNDERS.